United States Patent
Kang

(10) Patent No.: US 10,853,665 B2
(45) Date of Patent: Dec. 1, 2020

(54) METHOD AND DEVICE TO GENERATE VIRTUAL LANE

(71) Applicant: SAMSUNG ELECTRONICS CO., LTD., Suwon-si (KR)

(72) Inventor: Hyoa Kang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 15/708,364

(22) Filed: Sep. 19, 2017

(65) Prior Publication Data

US 2018/0247138 A1 Aug. 30, 2018

(30) Foreign Application Priority Data

Feb. 28, 2017 (KR) .................. 10-2017-0026524

(51) Int. Cl.
| | |
|---|---|
| G06K 9/00 | (2006.01) |
| G06T 11/20 | (2006.01) |
| G05D 1/02 | (2020.01) |
| G06K 9/62 | (2006.01) |
| G08G 1/16 | (2006.01) |
| B60W 30/00 | (2006.01) |
| G08G 1/0962 | (2006.01) |

(52) U.S. Cl.
CPC ......... *G06K 9/00798* (2013.01); *B60W 30/00* (2013.01); *G05D 1/0212* (2013.01); *G05D 1/0231* (2013.01); *G05D 1/0278* (2013.01); *G06K 9/6218* (2013.01); *G06K 9/6262* (2013.01); *G06T 11/203* (2013.01); *G08G 1/09623* (2013.01); *G08G 1/165* (2013.01); *G08G 1/166* (2013.01); *G08G 1/167* (2013.01); *G05D 2201/0213* (2013.01); *G06K 9/00201* (2013.01); *G06K 9/00805* (2013.01)

(58) Field of Classification Search
CPC ...................................................... G06K 9/00
USPC ...................................................... 382/103
See application file for complete search history.

(56) References Cited

U.S. PATENT DOCUMENTS

| | | | |
|---|---|---|---|
| 5,959,569 A * | 9/1999 | Khodabhai | ........ B60K 31/0008 342/70 |
| 9,120,486 B1 | 9/2015 | Mallinger | |
| 9,127,956 B2 | 9/2015 | Einecke et al. | |
| 9,199,641 B2 | 12/2015 | Ferguson et al. | |

(Continued)

FOREIGN PATENT DOCUMENTS

| | | |
|---|---|---|
| JP | 2015161967 A | 9/2015 |
| KR | 10-1249366 B1 | 4/2013 |

(Continued)

OTHER PUBLICATIONS

Partial European Search Report dated Jul. 25, 2018 in corresponding European Patent Application No. 17208859.3 (12 pages in English).

(Continued)

*Primary Examiner* — Jerome Grant, II
(74) *Attorney, Agent, or Firm* — Sughrue Mion, PLLC

(57) ABSTRACT

A virtual lane generating method and device is provided. The virtual lane generating method includes determining validity of lane detection information extracted from an image in front a vehicle, and generating a virtual lane based on an object included in the image, in response to a determination that the lane detection information is not valid.

31 Claims, 17 Drawing Sheets

(56) References Cited

U.S. PATENT DOCUMENTS

| | | | |
|---|---|---|---|
| 9,406,232 B2 | 8/2016 | Kataoka | |
| 2011/0102579 A1* | 5/2011 | Sung | G06K 9/00798 348/135 |
| 2012/0221168 A1* | 8/2012 | Zeng | G08G 1/16 701/1 |
| 2014/0067187 A1* | 3/2014 | Ferguson | B60W 30/00 701/28 |
| 2015/0070501 A1 | 3/2015 | Ooi | |
| 2015/0175204 A1* | 6/2015 | Oh | G08G 1/167 701/300 |
| 2016/0180180 A1* | 6/2016 | Gupta | G06K 9/00798 348/148 |
| 2016/0223651 A1 | 8/2016 | Kamo et al. | |
| 2016/0238705 A1 | 8/2016 | Mukai et al. | |
| 2017/0025018 A1* | 1/2017 | Gignac | H04W 4/023 |
| 2017/0262734 A1* | 9/2017 | Nakata | G08G 1/166 |
| 2018/0120851 A1* | 5/2018 | Shin | B62D 15/0285 |
| 2018/0129854 A1* | 5/2018 | Jeon | G06K 9/00798 |
| 2018/0154899 A1* | 6/2018 | Tiwari | G08G 1/0112 |
| 2018/0170388 A1* | 6/2018 | Shin | G05D 1/0088 |
| 2018/0178785 A1* | 6/2018 | Lin | B60W 30/0956 |
| 2018/0182238 A1* | 6/2018 | Fowe | G08G 1/065 |
| 2018/0246515 A1* | 8/2018 | Iwama | B60R 11/04 |
| 2018/0286095 A1* | 10/2018 | Kusayanagi | B60R 1/00 |
| 2019/0266890 A1* | 8/2019 | Lei | G08G 1/0133 |

FOREIGN PATENT DOCUMENTS

| | | | | |
|---|---|---|---|---|
| KR | 20130057112 | * | 5/2013 | ............ B60W 30/12 |
| KR | 10-1316353 B1 | | 10/2013 | |
| KR | 10-1526816 B1 | | 6/2015 | |
| KR | 20180056322 | * | 5/2018 | ............ G01A 13/88 |
| WO | WO 2015/197353 A2 | | 12/2015 | |

OTHER PUBLICATIONS

Communication dated Nov. 23, 2018, issued by the European Patent Office in counterpart European Application No. 17208859.3.

Hillel, A., et al., "Recent progress in road and lane detection: a survey", Apr. 1, 2014, Machine Vision and Applications, vol. 25, No. 3, pp. 727-745, 19 pages total, XP055113665.

* cited by examiner

METHOD AND DEVICE TO GENERATE VIRTUAL LANE

CROSS-REFERENCE TO RELATED APPLICATION(S)

This application claims the benefit under 35 USC § 119(a) of Korean Patent Application No. 10-2017-0026524 filed on Feb. 28, 2017, in the Korean Intellectual Property Office, the entire disclosure of which is incorporated herein by reference for all purposes.

BACKGROUND

1. Field

The following description relates to generating a virtual lane.

2. Description of Related Art

In automatic or autonomous driving, various driving operations may be automatically performed. For example, an autonomously driving host vehicle may travel on a road without a driver operation, such as turning a steering wheel, actuating an accelerator pedal or a brake pedal. Various technologies for the autonomous driving use surrounding image information that is determined by a vehicle. A lane for such autonomous driving may be detected from a forward-view image of the vehicle. However, collectable information may be restricted by, for example, a surrounding geography of the vehicle, adverse weather conditions, for example, snow, rain, and fog, and road conditions.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, there is provided a virtual lane generating method, including determining validity of lane detection information extracted from an image in front a vehicle, and generating a virtual lane based on an object included in the image, in response to a determination that the lane detection information is not valid.

The generating of the virtual lane may include detecting the object from the image, and generating the virtual lane based on the detected object.

The detecting of the object may include detecting an object region including the object and a feature region including a feature portion of the object.

The generating of the virtual lane may include generating at least one driving group by clustering objects present in the image, and generating the virtual lane based on the at least one driving group.

The generating of the virtual lane based on the at least one driving group may include estimating lane regions based on a region occupied by each of the at least one driving group, in response to the at least one driving group including a plurality of driving groups, generating a virtual lane boundary line between each of the estimated lane regions, and generating the virtual lane based on the virtual lane boundary lines.

The image may include consecutive frame images, and the generating of the virtual lane may include generating a driving group by tracking an object included in the consecutive frame images during a time period, and identifying the virtual lane based on the driving group.

The identifying of the driving group may include generating the driving group by tracking a movement of the object, in response to a speed of the object differing from a speed of the vehicle.

The determining of the validity of the lane detection information may include extracting the lane detection information from the image, and determining whether a validity score of the lane detection information exceeds a threshold score.

The determining of whether the validity score exceeds the threshold score may include calculating the validity score based on any one or any combination of luminance level information associated with a luminance level around the vehicle, weather information, time information, and image quality information of the image.

The virtual lane generating method may including displaying the virtual lane.

The determining of the validity of the lane detection information may include determining the validity of the lane detection information based on a feature of an object detected from the image.

The determining of the validity of the lane detection information may include detecting a warning object from the image, and excluding, from the lane detection information, a lane boundary line corresponding to the warning object.

The generating of the virtual lane may include detecting a target object from the image, and excluding the target object in the generating of the virtual lane, in response to indication information being detected from the target object.

The virtual lane generating method may include generating a driving route based on the generated virtual lane.

The determining of the validity of the lane detection information may include verifying whether a movement route of a target object matches a lane that is based on the lane detection information, and excluding a lane boundary line corresponding to the target object from the lane detection information, in response to the movement route not matching the lane that is based on the lane detection information.

The determining of the validity of the lane detection information may include excluding a lane boundary line corresponding to a target object from the lane detection information, in response to a movement speed of the target object decreasing to less than a threshold speed.

The generating of the virtual lane may include detecting depth information indicating a distance to the object detected from the image, and generating the virtual lane based on the image and the depth information.

The generating of the virtual lane may include generating the virtual lane based on location information of the vehicle and road information corresponding to the location information.

The determining of the validity of the lane detection information may include excluding a lane boundary line from the lane detection information, in response to a probability of the lane boundary line being less than a threshold probability.

The determining of the validity of the lane detection information may include calculating at least two validity scores based on any one or any combination of luminance level information associated with a luminance level around the vehicle, weather information, time information, a level of pollution, cleanliness of an exterior of the vehicle, and image quality information of the image, and verifying whether the at least two validity score of the extracted lane detection information exceeds respective threshold scores.

The determining of the validity of the lane detection information may include determining that the lane detection information is not valid, in response to a validity score of the extracted lane detection information oscillating greater than a threshold oscillation.

The object may include a target object that is tracked to generate the virtual lane, a warning object associated with information that warns the vehicle of danger, or a fixed object that is stationary.

The generating of the virtual lane may include obtaining weather information at a location of the vehicle, and generating the virtual lane based on the image and the weather information.

The virtual lane generating method may include excluding adjacent lane boundary lines from among the lane boundary lines, in response to a distance between the adjacent lane boundary lines being less than a threshold distance.

In another general aspect, there is provided a virtual lane generating device, including an image acquirer configured to obtain an image in front of a vehicle, and a processor configured to determine validity of lane detection information extracted from the image, and to generate a virtual lane based on an object in the image, in response to a determination that the lane detection information is not valid.

In another general aspect, there is provided a virtual lane generating method, including determining validity of lane detection information extracted from an image in front a vehicle, generating at least one driving group by clustering objects present in the image, in response the lane detection information being invalid, estimating lane regions based on a region occupied by each of the at least one driving group, in response to the at least one driving group including a plurality of driving groups, generating a virtual lane boundary line between each of the estimated lane regions, and generating a virtual lane based on the virtual lane boundary lines.

The objects may include any one or any combination of a target object that is tracked to generate the virtual lane, a preceding vehicle, a nearby vehicle, a vehicle feature, a warning object associated with information that warns the vehicle of danger, and a fixed object that is stationary.

The generating of the driving groups may include obtaining road information at a location of the vehicle, and determining a maximum number and a minimum number of driving groups to be generated based on the road information.

The road information may include any one or any combination of a width of a road at the location, a number of lanes on the road at the location, and a condition of the road at the location.

In another general aspect, there is provided a virtual lane generating apparatus including a sensor configured to capture an image in front of a vehicle, a touch-sensitive display, a memory configured to store instructions, a processor configured to receive the image, and execute the instructions to determine validity of lane detection information extracted from the image, to generate a virtual lane based on an object in the image, in response to a the lane detection information being invalid, and to output the virtual lane to the display or an autonomous driving apparatus.

The processor may be configured to generate the virtual lane based on the object, location information collected from a Global Positioning System (GPS), and Light Detection and Ranging data (LiDAR).

Other features and aspects will be apparent from the following detailed description, the drawings, and the claims.

Figure 1:
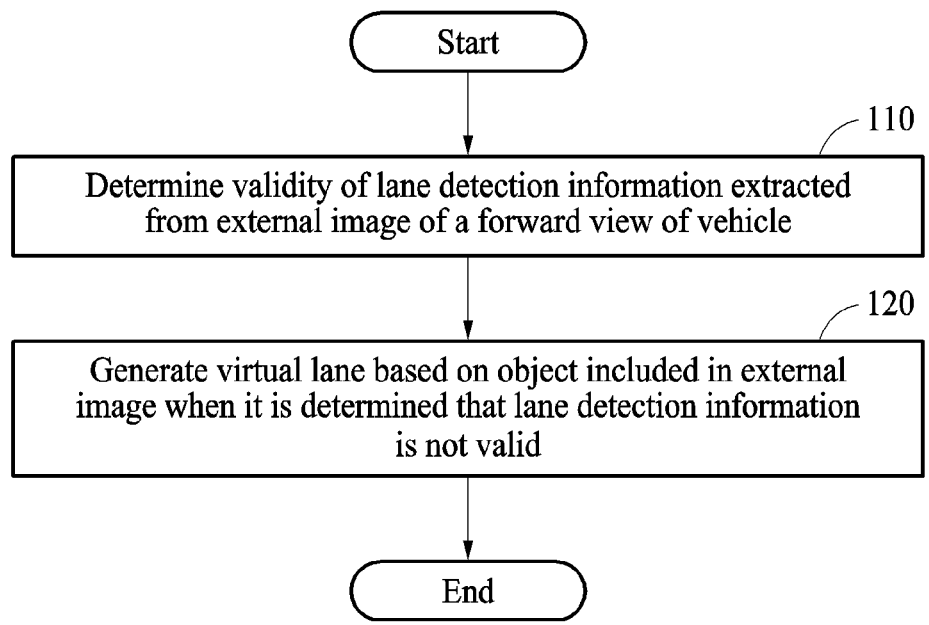
FIGS. 1 and 2 are diagrams illustrating examples of a virtual lane generating method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise.

Figure 2:
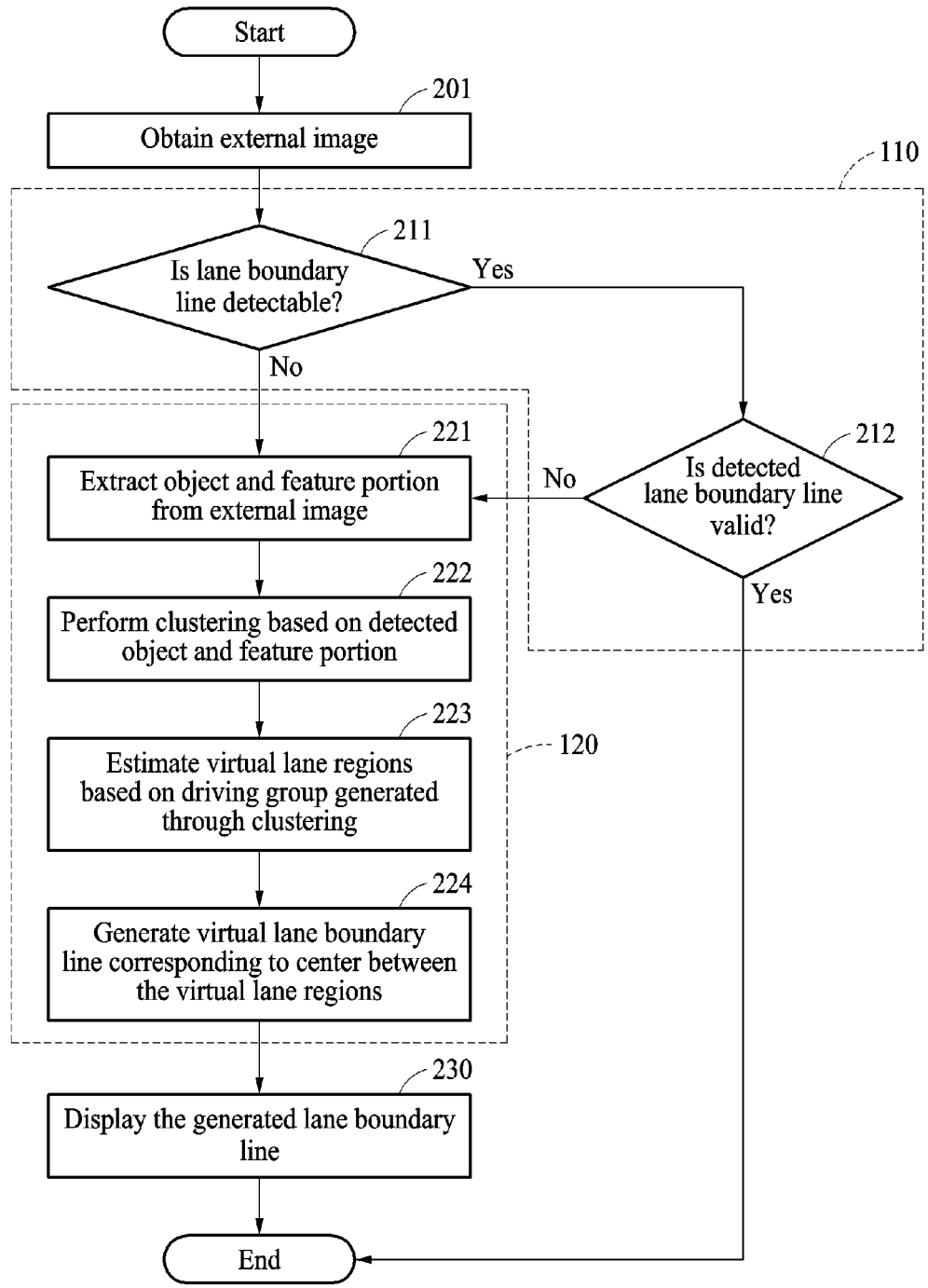

FIGS. 1 and 2 are diagrams illustrating examples of a virtual lane generating method. The operations in FIGS. 1-2 may be performed in the sequence and manner as shown, although the order of some operations may be changed or some of the operations omitted without departing from the spirit and scope of the illustrative examples described. Many of the operations shown in FIGS. 1-2 may be performed in parallel or concurrently. One or more blocks of FIGS. 1-2, and combinations of the blocks, can be implemented by special purpose hardware-based computer that perform the specified functions, or combinations of special purpose hardware and computer instructions.

Referring to FIG. 1, in operation 110, a virtual lane generating device determines validity of lane detection information extracted from an external image from a forward view of a vehicle. The external image is an image of a portion in front of the vehicle.

In an example, the virtual lane generating device is provided in the vehicle. The vehicle refers to any mode of transportation, delivery, or communication such as, for example, an automobile, a truck, a tractor, a scooter, a motorcycle, a cycle, an amphibious vehicle, a snowmobile, a public transit vehicle, a bus, a monorail, a train, a tram, an unmanned aerial vehicle, or a drone.

In an example, the virtual lane generating device is incorporated in vehicular guidance apparatuses such as, for example, cruise control, adaptive cruise control, lane keeping assist system, and land departure warning system.

In another example, the virtual lane generating device is included in another device placed in the vehicle. In an example, the virtual lane generating device is embodied or incorporated in various types of products such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, a personal computer (PC), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a high definition television (HDTV), a smart appliance, communication systems, image processing systems, graphics processing systems, various Internet of Things (IoT) devices that are controlled through a network, a smart vehicle, an intelligent automobile, an autonomous driving vehicle, other consumer electronics/information technology(CE/IT) device, or any other device capable of wireless communication or network communication consistent with that disclosed herein.

In another example, the virtual lane generating device is external to the vehicle, and is disposed in a device, such as, for example, a computer, a server, and a mobile phone, and communicates with the vehicle through wireless communication or network communication consistent with the disclosed herein.

In an example, the lane detection information refers to information associated with a lane detected from the forward view of the vehicle. The lane detection information includes information, such as, for example, a lane boundary line and a lane region in the external image. The lane boundary line refers to a boundary line between lanes. The lane region refers to a region corresponding to a lane in the external image.

The determining of the validity of the lane detection information is described further with reference to FIGS. 4 through 7.

In operation 120, when it is determined that the lane detection information is invalid, the virtual lane generating device generates a virtual lane based on an object included in the external image. In an example, the object is another vehicle different from the vehicle including the virtual lane generating device, a human being, an stationary object, or an animal. However, the object is not limited to the foregoing examples, but includes all other objects that do not depart from the spirit and scope of the illustrative examples described. The virtual lane refers to a lane along which the vehicle may travel, and that is estimated by the virtual lane generating device.

In an example, when the virtual lane generating device fails to identify the lane boundary line from the external image, the virtual lane generating device generates a new virtual lane based on an object that is currently present around the vehicle to aid the vehicle in traveling.

When it is determined that the lane detection information is valid, the virtual lane generating device uses the valid lane detection information to generate the virtual lane. In an example, the virtual lane generating device displays the valid lane detection information to a user, or generates a driving route for a vehicle such as, for example, an autonomous driving vehicle.

FIG. 2 is a diagram illustrating an example of the virtual lane generating method. In addition to the description of FIG. 2 below, the descriptions of FIG. 1 are also applicable to FIG. 2, and are incorporated herein by reference. Thus, the above description may not be repeated here.

Referring to FIG. 2, in operation 201, the virtual lane generating device obtains the external image. In an example, the virtual lane generating device obtains the external image by capturing an image from the forward view of the vehicle. In an example, the external image is a color image. However, other types of external image, such as, for example, an infrared image, a grayscale image, and a depth image may be used without departing from the spirit and scope of the illustrative examples described.

As discussed above, in operation 110, the virtual lane generating device determines the validity of the lane detection information. The virtual lane generating device extracts the lane detection information from the external image.

In operation 211, the virtual lane generating device determines whether the lane boundary line is detectable. In an example, when the lane boundary line is not detected, the virtual lane generating device determines that the lane detection information is not valid. For example, the lane boundary line may not be detected from a road ahead of the vehicle is circumstances, such as, for example, a road in a rural area that is not well defined or where a painted portion of the lane boundary line has peeled off. In an example, the lane boundary line is not detected when a probability of the lane boundary line is less than a threshold probability.

In operation 212, when the lane boundary line is detected, the virtual lane generating device determines whether the detected lane boundary line is valid. In an example, the virtual lane generating device determines whether a validity score of the extracted lane detection information exceeds a threshold score.

The validity score refers to a score indicating the validity of the lane detection information. In an example, the virtual lane generating device calculates the validity score based on at least one of luminance level information association with a luminance around the vehicle, weather information, time information, level of pollution in or around the road, cleanliness of an exterior of the vehicle, or image quality information of the external image. In an example, the validity score is calculated based on at least two of the luminance level information, the weather information, the time information, the level of pollution in or around the road, the cleanliness of an exterior of the vehicle or the image quality information. However, a method of calculating the validity score is not limited to the example described above, and a plurality of validity scores may be calculated using the information described above.

The luminance level information refers to information indicating a luminance level around the vehicle. The weather information refers to information indicating the weather where the vehicle is located. The time information refers to information associated with a current time of the vehicle. In an example, the time information indicates whether the current time is daytime or nighttime. The image quality information refers to information indicating a quality of the external image. In an example, the level of pollution in or around the road indicates the smog level around the vehicle. In an example, the cleanliness of the exterior of the vehicle indicates whether or not the exterior is enveloped in dust or dirt.

For example, when a single validity score is calculated based on at least one of the luminance level information, the weather information, the time information, the image quality information, the level of pollution in or around the road, or the cleanliness of the exterior of the vehicle, the virtual lane generating device determines a single threshold score, and determines whether the single validity score exceeds the threshold score. In another example, when a plurality of validity scores are calculated based on at least two of the luminance level information, the weather information, the time information, the level of pollution in or around the road, the cleanliness of an exterior of the vehicle, or the image quality information, the virtual lane generating device determines a plurality of threshold scores respectively corresponding to the validity scores, and determines whether each of the validity scores exceeds each corresponding threshold score.

When the validity score exceeds the threshold score, the virtual lane generating device determines that the lane detection information is valid. When the validity score is less than or equal to the threshold score, the virtual lane generating device determines that the lane detection information is not valid. When a plurality of validity scores are calculated, the virtual lane generating device determines that the lane detection information is not valid when one of the validity scores is less than or equal to a corresponding threshold value. However, the calculating of the validity score is not limited to the example described above. In an example, when a number of validity scores exceeding the corresponding threshold scores is less than or equal to a preset number, the virtual lane generating device determines that the lane detection information is not valid. Thus, in a case in which a luminance level around the vehicle is less than or equal to a threshold value due to various reasons, for example, it being nighttime and the visibility being low, the virtual lane generating device determines that using the lane detection information is not possible. When using the weather information, in an example, the virtual lane generating device determines that a reliability of the lane detection information is low in a snowy or rainy weather. In an example, where an oscillation of the validity score exceeds a threshold oscillation, the virtual lane generating device determines that the lane detection information is not valid.

Determining the validity of the lane detection information based on the validity score is a non-exhaustive example, and the validity of the lane detection information may be determined based on various other factors, such as, for example, a feature of an object. The determining of the validity of the lane detection information will be described with reference to FIGS. 4 through 7.

When it is determined that the detected lane boundary line is valid, the virtual lane generating device uses the information on the detected lane boundary line without generating the virtual lane.

In operation 120, when it is determined that the lane detection information is not valid, the virtual lane generating device generates the virtual lane based on the object included in the external image.

In an example, in operation 221, the virtual lane generating device extracts the object and a feature portion of the object from the external image. The virtual lane generating device detects an object present in front of the vehicle from the external image. The virtual lane generating device detects an object region including the object and a feature region including the feature portion of the object. The object region refers to a region corresponding to the object in the external image. The feature region refers to a region corresponding to the feature portion in the external image. The feature portion refers to a portion indicating a feature of the object. In a case of the object being a vehicle, the feature of the object may include, for example, taillights on either or both sides of the vehicle, a rearview mirror, wheels, and a license plate. The extracting of the object and the feature portion will be further described with reference to FIG. 8.

In operation 222, the virtual lane generating device performs clustering based on the detected object and the detected feature portion. In an example, the virtual lane generating device generates a driving group by clustering objects present in front of the vehicle in the external image. The clustering will be further described with reference to FIG. 9.

In operation 223, the virtual lane generating device estimates a virtual lane region based on the driving group generated through the clustering. In an example, when a plurality of driving groups are generated, the virtual lane generating device estimates a plurality of virtual lane regions based on a region occupied by each of the driving groups. The estimating of the virtual lane region will be further described with reference to FIG. 11.

In operation 224, in an example, the virtual lane generating device generates a virtual lane boundary line corresponding to a center between the virtual lane regions. In an example, the virtual lane generating device generates the virtual lane based on the generated virtual lane boundary line. The virtual lane generating device generates the virtual lane boundary line between each of the estimated virtual lane regions. The virtual lane refers to an estimated lane along which the vehicle may travel, and which is demarcated by the virtual lane boundary line. The generating of the virtual lane boundary line will be further described with reference to FIG. 12.

Thus, the virtual lane generating device generates the virtual lane by estimating the virtual lane boundary line based on the detected object. However, a method of generating the virtual lane is not limited to the example described in the foregoing, and the virtual lane generating device may generate the virtual lane based on other factors such as, for example, the external image, depth information, the driving group, location information associated with a point at which the vehicle is located, and road information corresponding to the location information. In an example, the location information includes global positioning system (GPS) information associated with the point at which the vehicle is located, and the road information refers to information associated with a road and includes a number of lanes on the road, the type of road, the location of the road, a road under construction, and a closed road.

In operation 230, the virtual lane generating device displays the generated virtual lane boundary line. In an example, the virtual lane generating device displays the virtual lane boundary line on a windshield glass of the vehicle through a head-up display (HUD). However, the displaying of the virtual lane boundary line is not limited to the example described in the forgoing, and any other instrument cluster or display panel in the vehicle may perform the display function. In another example, when the windshield glass is connected to the virtual lane generating device, the virtual lane generating device may request the windshield glass to display the virtual lane boundary line. Other displays, such as, for example, smart phone and eye glass display (EGD) that are operatively connected to the virtual lane generating device may be used without departing from the spirit and scope of the illustrative examples described. The display of the virtual lane boundary line will be further described with reference to FIG. 13.

In an example, when a lane boundary line on a road is not readily recognizable due to, for example, a heavy rain, the virtual lane generating device may estimate a movement route of a nearby vehicle based on the nearby vehicle and a feature portion of the nearby vehicle. In an example, the virtual lane generating device generates a virtual lane boundary line based on the estimated movement route and provides the generated virtual lane boundary line to aid a driver or an autonomous driving vehicle in driving.

Figure 3:
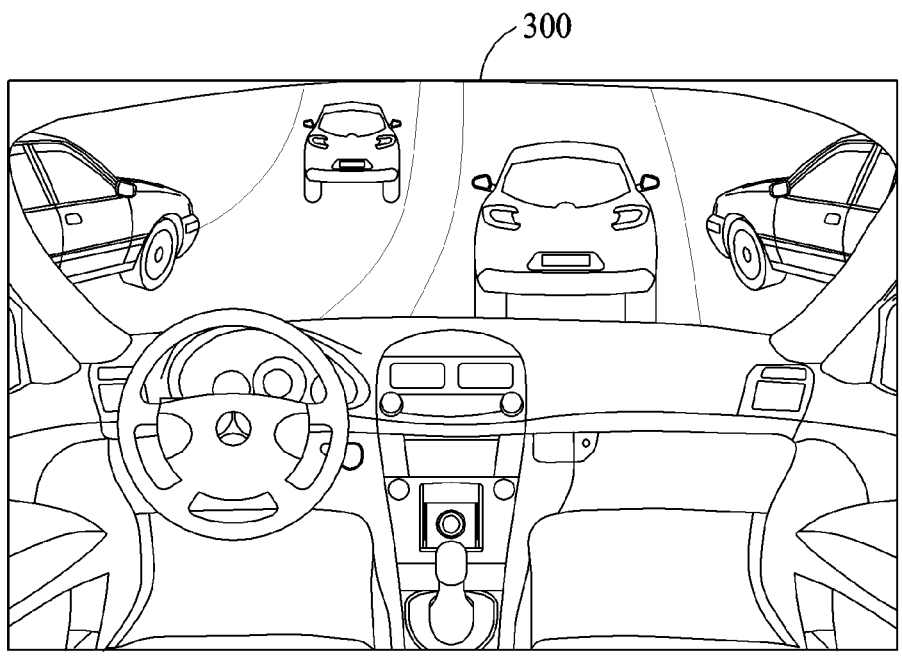
FIG. 3 is a diagram illustrating an example of a method of obtaining an external image.

FIG. 3 is a diagram illustrating an example of a method of obtaining an external image.

Referring to FIG. 3, a virtual lane generating device obtains an external image 300 from a forward view of a vehicle. The virtual lane generating device may be provided in the vehicle, and a camera of the virtual lane generating device may be disposed to face a front side of the vehicle. The external image 300 may be a color image. However, the external image 300 is not limited to the color image, and may be a black and white image, an infrared image, or a depth image.

FIGS. 4 through 7 are diagrams illustrating examples of methods of determining validity of lane detection information.

Figure 4:
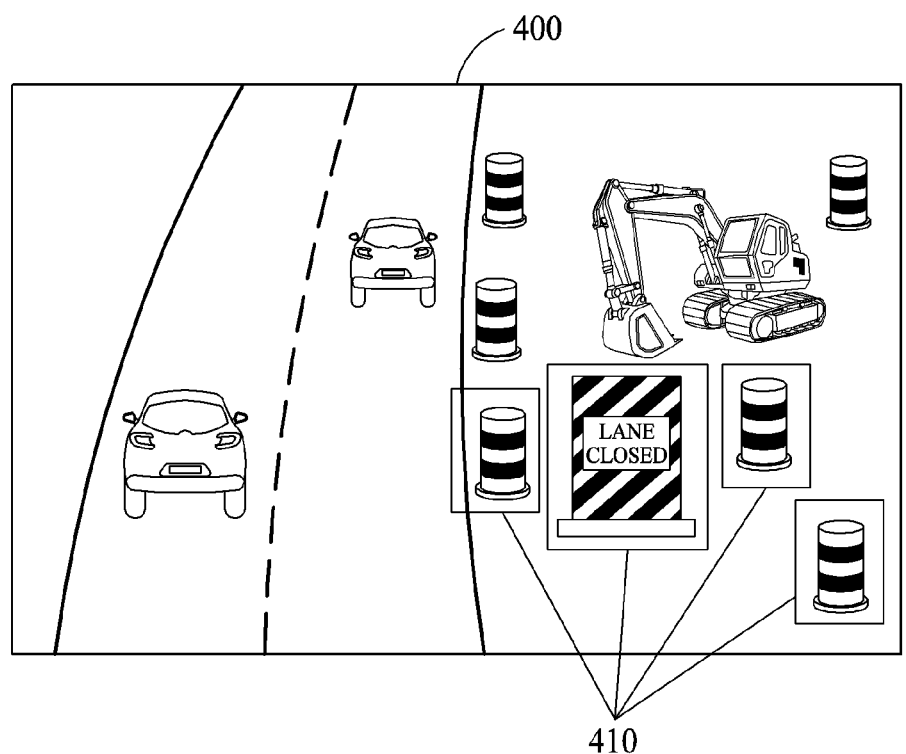
FIGS. 4 through 7 are diagrams illustrating examples of a method of determining validity of lane detection information.

Referring to FIG. 4, a virtual lane generating device obtains an external image 400 while a vehicle is passing by a construction site.

In an example, the virtual lane generating device determines validity of lane detection information based on a feature of an object detected from a forward view of the vehicle. In an example, as illustrated in FIG. 4, the virtual lane generating device detects a plurality of objects from the external image 400, and identifies a feature of each of the detected objects. In an example, the objects are classified into a target object, a warning object 410, and a fixed object based on a feature of an object. The target object refers to an object, which is a target to be tracked to generate a virtual lane, for example, another vehicle traveling before the vehicle, or a preceding vehicle. The warning object 410 refers to an object associated with information that warns the vehicle of danger and may be, for example, a sign indicating a construction site and an obstacle located on a road. The fixed object refers to an object fixed to a road or is stationary and may be, for example, a light pole or a vehicle that has stopped or is parked at an edge of a road.

The virtual lane generating device detects the warning object 410 from the forward view of the vehicle. In the example of FIG. 4, the warning object 410 is illustrated as an indicator board indicating a closed lane and an obstacle preventing an entry of a vehicle.

The virtual lane generating device excludes a lane boundary line corresponding to the warning object 410 from the lane detection information. In an example, the virtual lane generating device excludes, from the lane detection information, a lane boundary line corresponding to a lane in which the warning object 410 is disposed.

In another example, the virtual lane generating device may determine whether a movement route of the target object matches a lane that is based on the lane detection information. When the movement route does not match the lane, the virtual lane generating device may exclude a lane boundary line corresponding to the target object from the lane detection information.

In still another example, when a movement speed of the target object decreases to less than a threshold speed, the virtual lane generating device may exclude a lane boundary line corresponding to the target object from the lane detection information.

When the detected lane boundary line is excluded from the lane detection information and there is no valid lane boundary line, the virtual lane generating device may determine that the lane detection information is not valid.

Determination of the validity of the lane detection information is not limited to the examples described in the foregoing. In another example, when information indicates that a road on which the vehicle is currently located is under construction is identified based on the road information, the virtual lane generating device may determine that at least a portion of lane detection information detected from the current location of the vehicle is not valid. In another example, when a manual operation is performed by a driver to, for example, generate a virtual lane, the virtual lane generating device may determine that the lane detection information is not valid.

Figure 5:
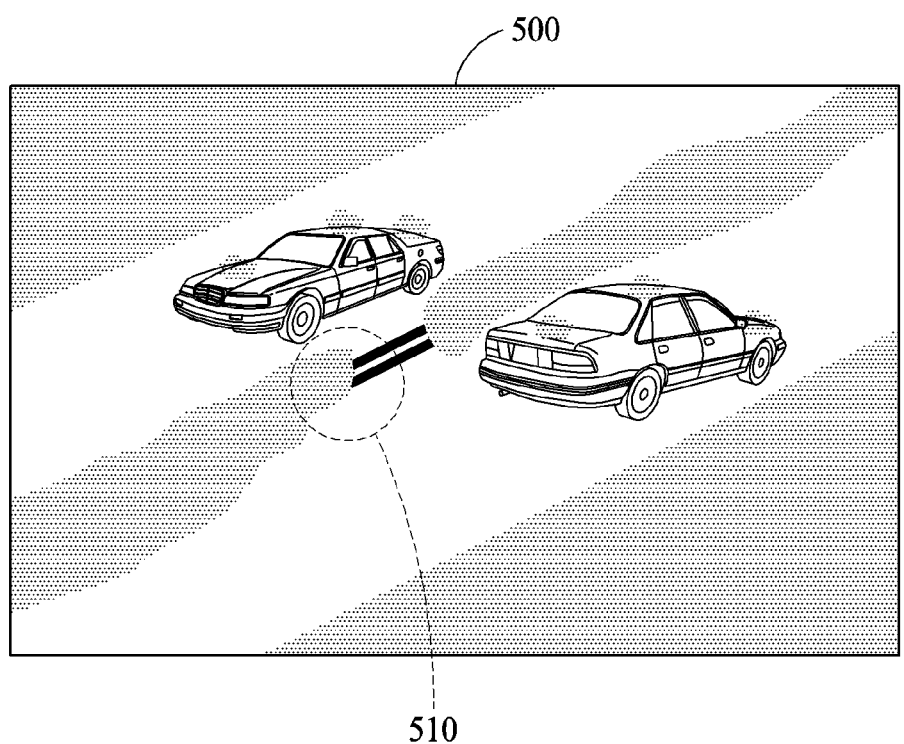

FIG. 5 is a diagram illustrating an example of an external image 500 from which a lane boundary line is not detected due to snow. When weather deteriorates and visibility is not good, a virtual lane generating device may determine that lane detection information is not valid. In an example, as illustrated in FIG. 5, a yellow center line 510 is partially covered with snow, and thus the virtual lane generating device does not detect a lane boundary line from the external image 500. In such an example, when the lane boundary line is not detected, and thus the virtual lane generating device determines that lane detection information is not valid.

However, a method of determining validity of the lane detection information is not limited to the examples described in the foregoing. In an example, and the virtual lane generating device uses weather information in addition to the external image 500. In an example, in a case in which the weather information corresponding to a current location of a vehicle indicates a weather condition that prevents visibility, for example, snow, rain, and cloudiness, the virtual lane generating device may determine that lane detection information is not valid.

Figure 6:
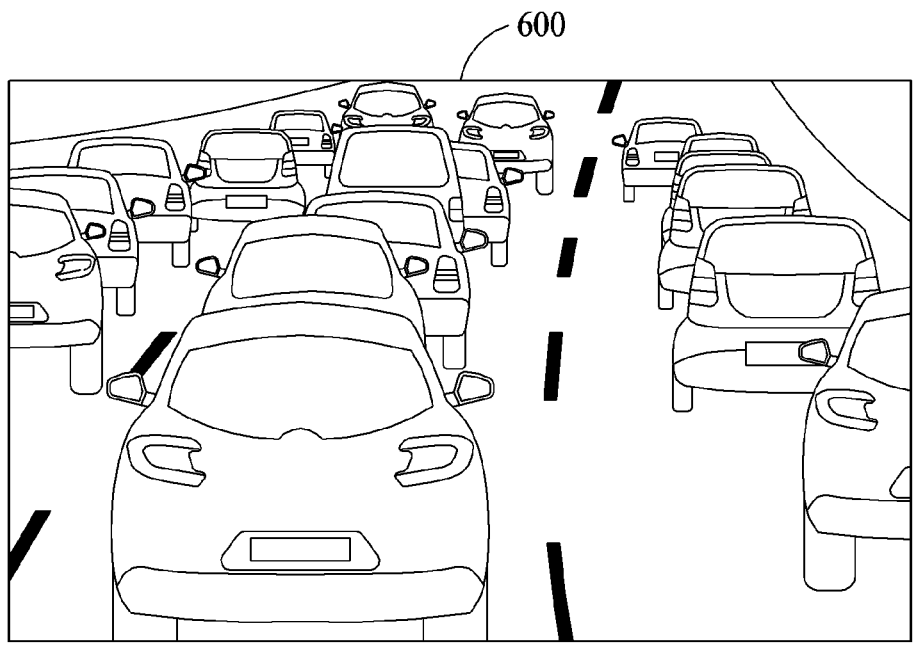

FIG. 6 is a diagram illustrating an example of an external image 600 obtained in a congested road. A lane boundary line covered with a plurality of other vehicles may not be detected, and thus a virtual lane generating device may determine that lane detection information is not valid.

Figure 7:
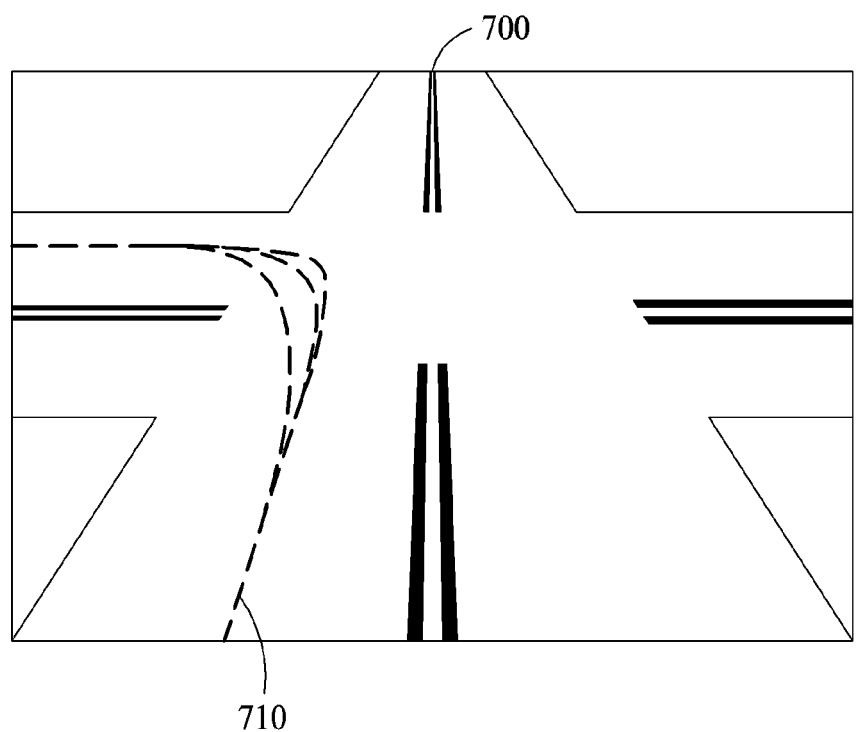

FIG. 7 is a diagram illustrating an example of an external image 700 including an intersection. In an example, as illustrated in FIG. 7, a plurality of lane boundary lines 710 overlaps with respect to a same route at the intersection. In such an example, a virtual lane generating may not detect an accurate lane boundary line. In an example, when a distance between the lane boundary lines 710 is less than a threshold distance, the virtual lane generating device determines that lane detection information is not valid.

However, a method of determining validity of the lane detection information is not limited to the example described in the foregoing. When road information corresponding to a current location of a vehicle indicates an intersection, the virtual lane generating device may determine that lane detection information detected from the current location is not valid.

In an example, when it is determined that lane detection information is not valid based on any of the method described with reference to FIGS. 3 through 7, the virtual lane generating device may perform methods or operations to be described with reference to FIGS. 8 through 15 to generate a virtual lane.

Figure 8:
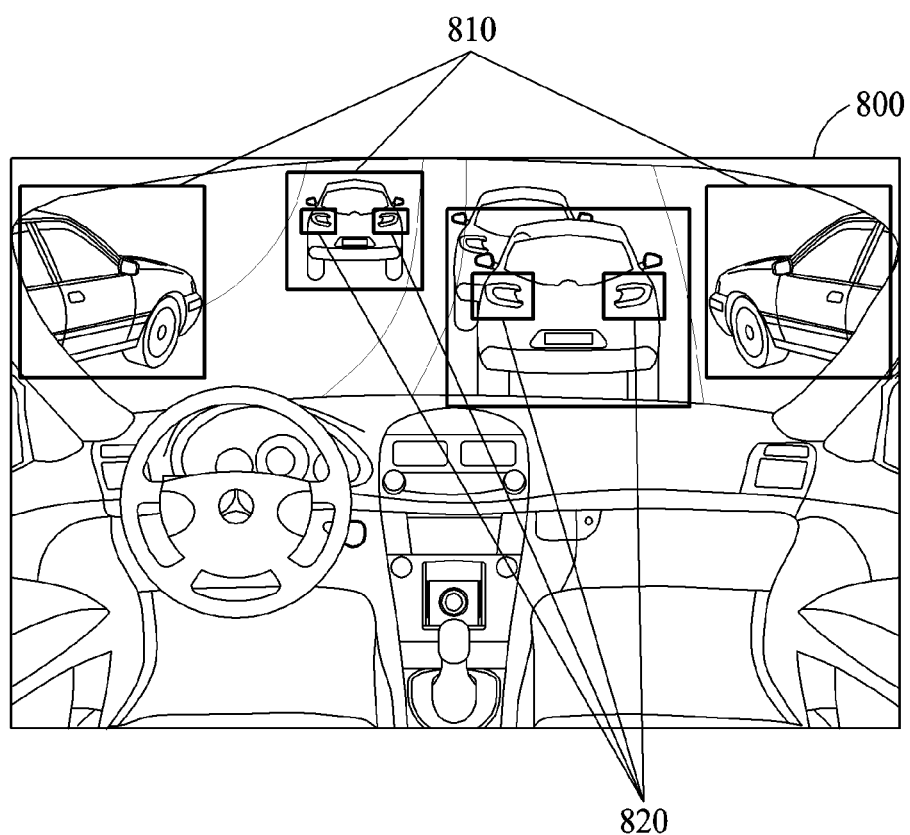
FIG. 8 is a diagram illustrating an example of a method of detecting an object and a feature portion.

FIG. 8 is a diagram illustrating an example of a method of detecting an object and a feature portion.

Referring to FIG. 8, a virtual lane generating device detects, from an external image 800, an object region 810 including an object and a feature region 820 including a feature portion of the object.

In an example, the virtual lane generating device detects the object region 810 including the object, using a neural network trained to detect an object, such as, for example, a vehicle. The virtual lane generating device detects the object region 810 using sensor information obtained by capturing an image through a light detection and ranging (LiDAR) sensor, in addition to the external image 800 captured by a camera. In an example, the sensor information includes information, such as, for example, depth information indicating a distance from the external image 800 to the detected object. The neural network refers to a model trained to detect the feature region 820 including the feature portion of the object along with the object.

Figure 9:
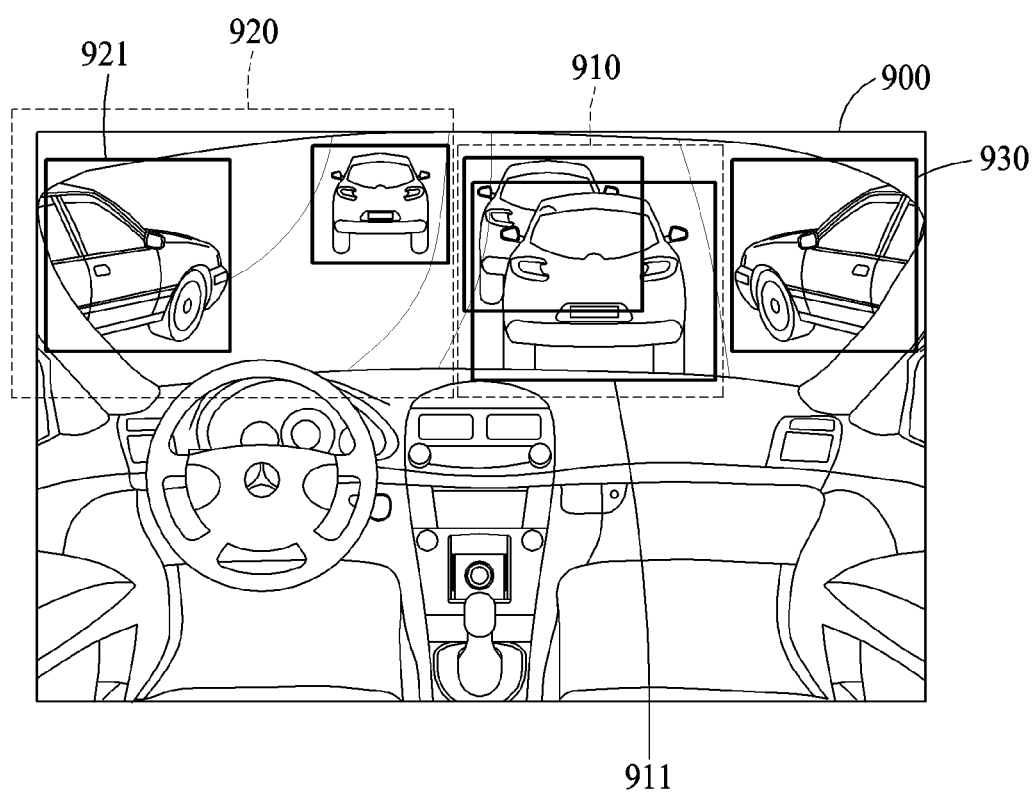
FIGS. 9 and 10 are diagrams illustrating examples of object clustering.
Figure 10:
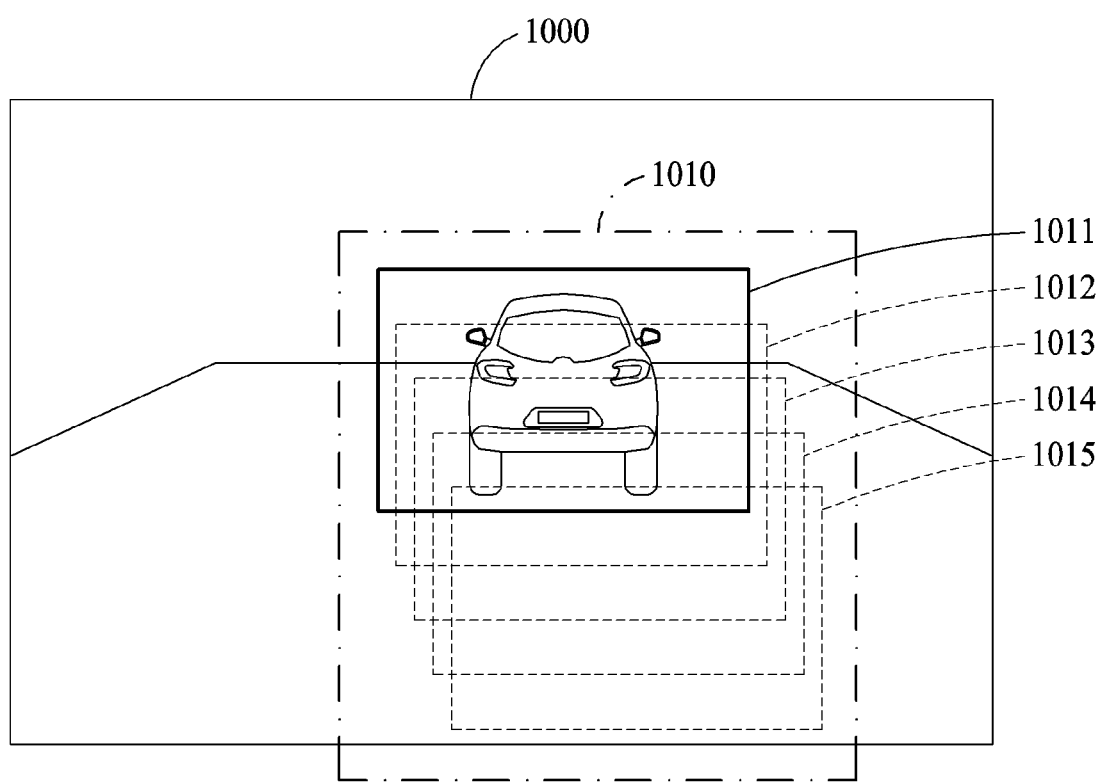

FIGS. 9 and 10 are diagrams illustrating examples of object clustering.

FIG. 9 is a diagram illustrating a method of clustering objects using an object region and a feature region detected using the method described with reference to FIG. 8. Referring to FIG. 9, a virtual lane generating device generates a driving group by performing clustering on objects present in front of a vehicle in an external image 900. The driving group refers to a group into which detected objects are classified based on a lane. In an example, the driving group is classified into a driving lane driving group 910 corresponding to a driving lane along which the vehicle is currently travelling, a left-side driving group 920 corresponding to a left side of the driving lane, and a right-side driving group corresponding to a right side of the driving lane. The driving lane refers to a lane along which the vehicle including the virtual lane generating device currently travels.

In an example, the virtual lane generating device clusters the objects based on location coordinates of object regions in the external image 900. The virtual lane generating device adds an object region 921 detected from a left side from first boundary coordinates to the left-side driving group 920. The virtual lane generating device adds an object region 930 detected from a right side from second boundary coordinates to the right-side driving group. The virtual lane generating device adds an object region 911 detected between the first boundary coordinates and the second boundary coordinates to the driving lane driving group 910. The first boundary coordinates and the second boundary coordinates are set to classify the driving groups in the external image 900. In an example, first boundary coordinates and the second boundary coordinates are set on a horizontal axis, or an x axis.

In an example, the virtual lane generating device uses a model trained to classify driving groups of object regions. In an example, the virtual lane generating device determines a driving group to which an object region belongs using a neural network, a support vector machine (SVM), and a decision tree.

However, the clustering is not limited to the example described in the foregoing, and in an example the virtual lane generating device clusters objects based on road information. In an example, the virtual lane generating device extracts, from road information that corresponds to a current location of a vehicle, a width of a road along which the vehicle travels currently, a condition of the road, and a number of lanes on the road. The virtual lane generating device estimates a maximum number and a minimum number of driving groups to be classified with respect to the road along which the vehicle travels currently based on the extracted width of the road and the number of the lanes.

FIG. 10 is a diagram illustrating an example of object clustering performed when a number of vehicles traveling in front of a current vehicle is less than or equal to 1 for each lane.

Referring to FIG. 10, a virtual lane generating device obtains an external image 1000 including consecutive frame images. The virtual lane generating device generates a driving group 1010 by tracking an object in the consecutive frame images during a time period. When the consecutive frames images are captured at m frames per second (fps), in which m denotes an integer greater than or equal to 1, for example, 30 or 60 fps, a time interval may be n/m, in which n denotes an integer greater than or equal to 1. In an example, the virtual lane generating device tracks an object region corresponding to the same object from each frame image during the time interval as illustrated in FIG. 10. The virtual lane generating device detects, in sequential order, a first object region 1015, a second object region 1014, a third object region 1013, a fourth object region 1012, and a fifth object region 1011. The virtual lane generating device performs clustering on the object regions 1011 through 1015 corresponding to the same object to generate the single driving group 1010. In the example of FIG. 10, n is 5.

When a speed of the object differs from a speed of a vehicle, the virtual lane generating device generates the driving group 1010 by tracking a movement of the object.

When a difference between the speed of the vehicle and a speed of a preceding vehicle is greater than or equal to a threshold difference, the virtual lane generating device tracks the movement of the object from the consecutive frame images. In an example, when the speed of the object is greater than the speed of the vehicle, the virtual lane generating device tracks the movement of the object.

In an example, the virtual lane generating device uses the methods of clustering described with reference to FIGS. 9 and 10 in combination. In an example, when a plurality of vehicles moves along a first lane and a single vehicle moves along a second lane, the virtual lane generating device performs clustering on the vehicles moving along the first lane to generate a driving group, and on the single vehicle moving along the second lane to generate a driving group based on consecutive tracking results for the single vehicle.

The clustering performed based on object regions is described with reference to FIGS. 9 and 10. However, the clustering is not limited to the described examples. In an example, the virtual lane generating device generates a driving group through clustering of taillights detected from a forward view of a vehicle. In another example, the virtual lane generating device generates a driving group through clustering of wheels detected from the forward view of the vehicle. In another example, the virtual lane generating device generates a driving group through clustering for each lane using depth information based on a LiDAR sensor, an actual width of a road on which a vehicle is currently located, and lane information.

Figure 11:
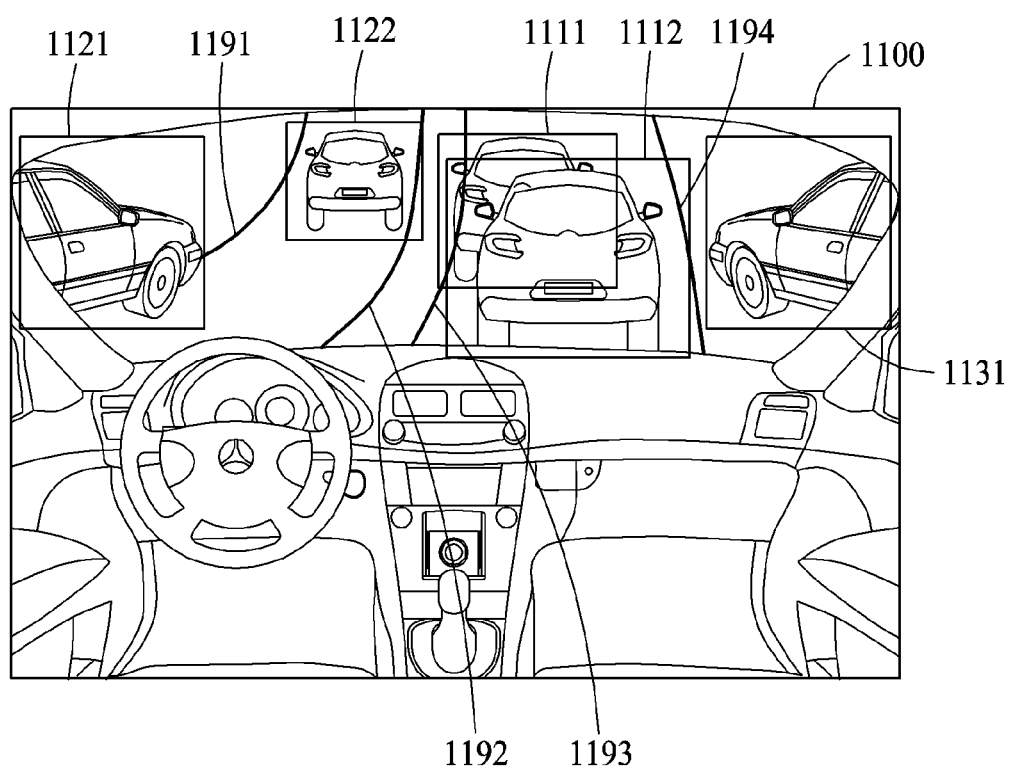
FIG. 11 is a diagram illustrating an example of a method of estimating lane regions.

FIG. 11 is a diagram illustrating an example of a method of estimating a plurality of lane regions.

In an example, a virtual lane generating device generates a lane region based on a driving group. In a case of a plurality of driving groups, the virtual lane generating device estimates a plurality of lane regions based on a region occupied by each of the driving groups. However, the estimating of a lane region is not limited to the example described in the foregoing. In an example, in a case of a single driving group, the virtual lane generating device may estimate a single lane region based on a region occupied by the single driving group.

Referring to FIG. 11, the virtual lane generating device generates outlines 1191 and 1192 indicating a left lane region for left driving groups 1121 and 1122 in an external image 1100. The virtual lane generating device generates outlines 1193 and 1194 indicating a central lane region for central driving groups 1111 and 1112. Similarly, the virtual lane generating device generates a right lane region for a right driving group 1131.

In an example, the virtual lane generating device generates a lane region through curve fitting performed on a region occupied by each driving group. The curve fitting methods may include methods such as, for example, a method using linear least squares and a method using a nonlinear regression model. In an example, a lane region is estimated through the curve fitting, for example, the method using linear least squares and the method using a nonlinear regression model, based on location information associated with central coordinates of a bounding box of a vehicle belonging to a driving group. In an example, a lane region is estimated through the curve fitting based on location information associated with outermost right coordinates of vehicles located on a left lane region and/or outermost left coordinates of vehicles located on a right lane region. In an example, a lane region is estimated through the curve fitting based on location information of feature points of vehicles. In each of the examples described in the foregoing, the location information is used as an input for the curve fitting.

In another example, the virtual lane generating device uses a model trained to generate a lane region based on an object region. The model trained to generate a lane region may be a model modified from an auto-encoder. However, the model is not limited to the example described in the foregoing, and thus the virtual lane generating device may use a model trained to output a lane region from a detected object region and a detected feature region.

Figure 12:
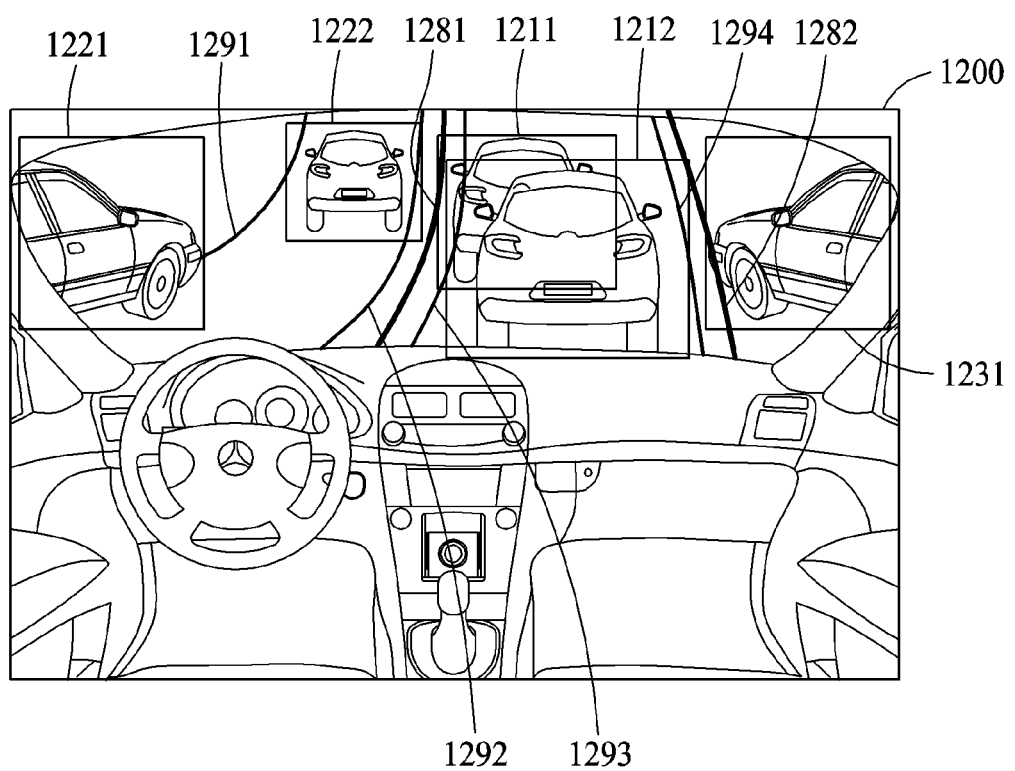
FIG. 12 is a diagram illustrating an example of a method of generating a virtual lane boundary line.

FIG. 12 is a diagram illustrating an example of a method of generating a virtual lane boundary line.

In an example, a virtual lane generating device generates a virtual lane boundary line based on a lane region extracted through the method described with reference to FIG. 11. Referring to FIG. 12, a lane region is estimated based on a region occupied by a driving group generated through clustering of object regions 1211, 1212, 1221, 1222, and 1231 detected from an external image 1200. The lane region is defined by outlines 1291, 1292, 1293, and 1294 indicating boundaries of lane regions.

The virtual lane generating device generates virtual lane boundary lines 1281 and 1282 between each of the estimated lane regions. In an example, the virtual lane generating device determines, to be the virtual lane boundary line 1281, a line crossing a center between neighboring lane regions among the lane regions. In the example of FIG. 12, the virtual lane generating device determines, to be the virtual lane boundary line 1281, a line crossing a center between the right outline 1292 of a left lane region and the left outline 1293 of a central lane region.

In an example, the virtual lane generating device determines a narrowest lane region and a widest lane region for a driving group corresponding to a preceding vehicle, and determines, to be a lane boundary line, an outline indicating a lane region having a width, which is a medium of the narrowest lane region and the widest lane region. In an example, the lane region having the medium width is a set of coordinates positioned on an average location between an outline indicating the narrowest lane region and an outline indicating the widest lane region.

However, examples are not limited to the example described in the foregoing. In a case in which a driving group corresponding to a preceding vehicle is generated based on a taillight of the vehicle, the virtual lane generating device may determine a lane region based on the taillight. The virtual lane generating device may generate a virtual lane boundary line by compensating a length, for example, a distance between a bumper of the vehicle and the taillight, for an outline indicating the determined lane region.

Figure 13:
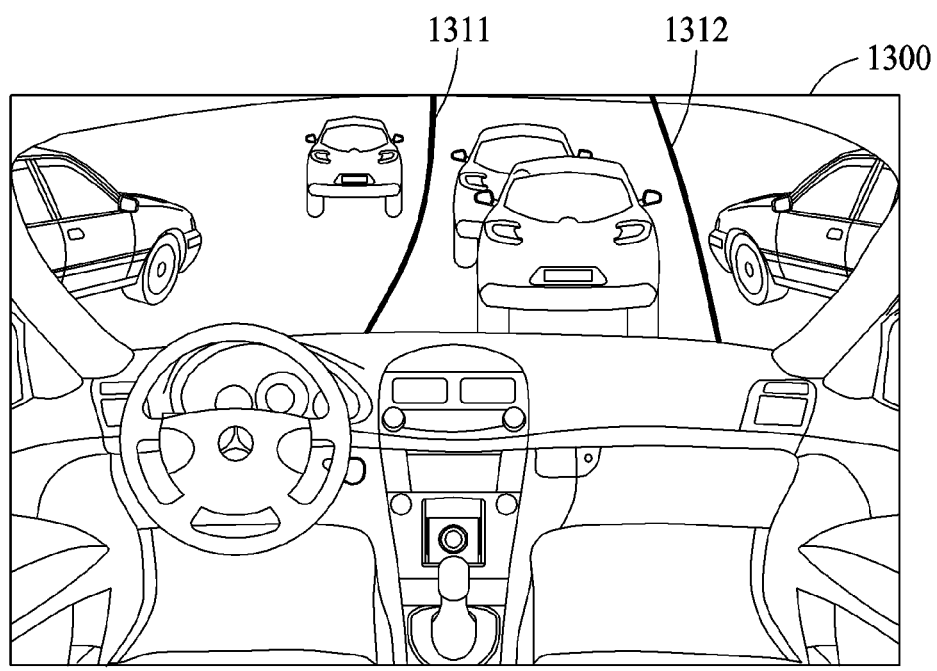
FIGS. 13 and 14 are diagrams illustrating examples of a virtual lane.
Figure 14:
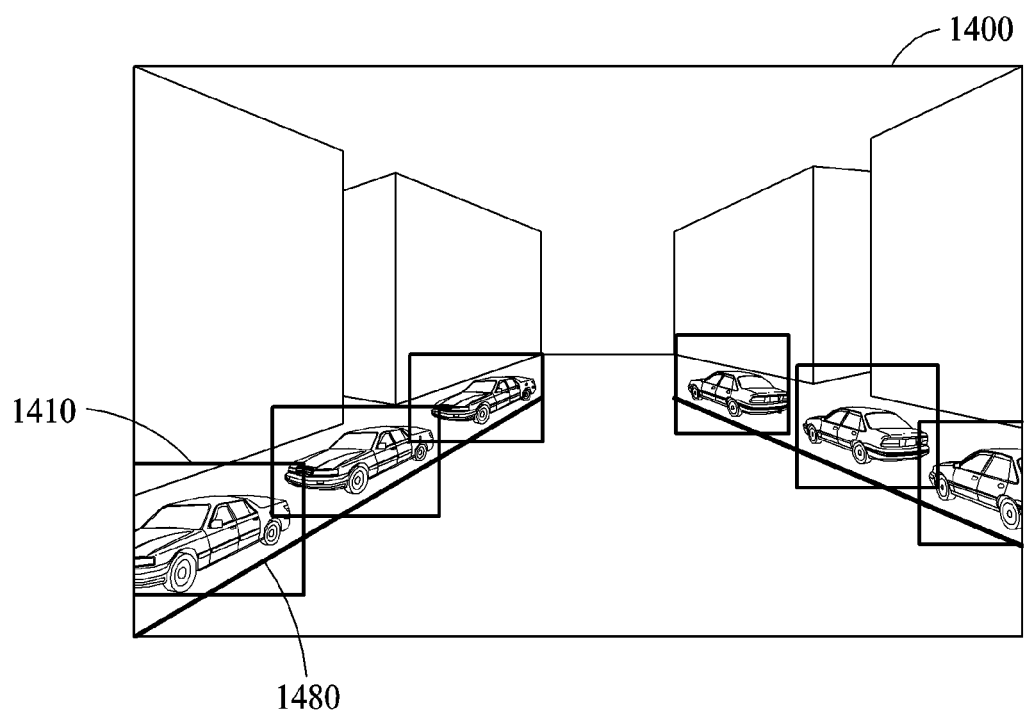

FIGS. 13 and 14 are diagrams illustrating examples of a virtual lane.

Referring to FIG. 13, a virtual lane generating device determines a virtual lane based on virtual lane boundary lines 1311 and 1312 generated through the method described with reference to FIG. 12.

The virtual lane generating device displays the generated virtual lane as illustrated in FIG. 13. In an example, the virtual lane generating device provides the virtual lane boundary lines 1311 and 1312 to a windshield glass 1300 of a vehicle through a heads-up display (HUD). In another example, the virtual lane generating device provides the virtual lane boundary lines 1311 and 1312 to an instrument cluster, a vehicular information system, a screen in the vehicle that uses augmented reality, or display panel in the vehicle.

In another example, the virtual lane generating device provides the virtual lane boundary lines 1311 and 1312 to a display situated in the vehicle. In an example, the display is a physical structure that includes one or more hardware components that provide the ability to render a user interface and/or receive user input. The display can encompass any combination of display region, gesture capture region, a touch sensitive display, and/or a configurable area. In an example, the display is an external peripheral device that may be attached to and detached from the virtual lane generating device. The display may be a single-screen or a multi-screen display. A single physical screen can include multiple displays that are managed as separate logical displays permitting different content to be displayed on separate displays although part of the same physical screen. The display may also be implemented as a smart phone or an eye glass display (EGD), which includes one-eyed glass or two-eyed glasses.

In another example, the virtual lane generating device outputs the virtual lane boundary lines 1311 and 1312 through an audio signal. In another example, the virtual lane generating device generates a driving route based on the generated virtual lane. In an example, when it is determined that lane detection information is not valid, the virtual lane generating device controls the vehicle to travel along the virtual lane. Thus, the virtual lane generating device may minimize danger that may be caused by a degradation of visibility during autonomous driving.

Referring to FIG. 14, fixed objects are present in an alley without a lane boundary line.

A virtual lane generating device detects an object 1410 from an external image 1400, and generates a virtual lane based on a feature of the object 1410. In an example, the virtual lane generating device determines a virtual lane boundary line 1480 based on an outline of a region occupied by fixed objects.

Thus, the virtual lane generating device may generate a virtual lane in an alley from which a lane boundary line is not detected, and provide the generated virtual lane to a user or an autonomous driving vehicle.

Figure 15:
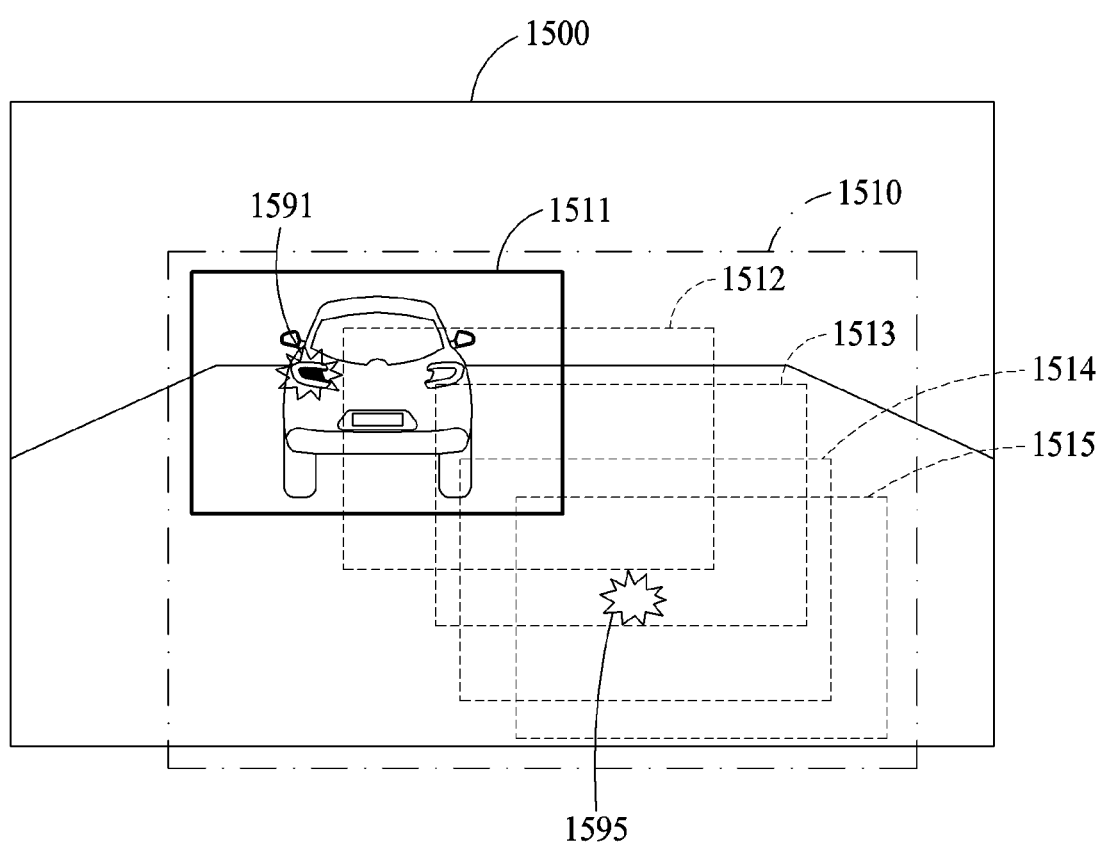
FIG. 15 is a diagram illustrating an example of indication information detected from a target object.

FIG. 15 is a diagram illustrating an example of indication information detected from a target object.

In an example, a virtual lane generating device detects a target object from a forward view of a vehicle. When indication information is detected from the target object, the virtual lane generating device may exclude the target object in a process of generating a virtual lane. Referring to FIG. 15, indication information, for example, indication information 1591 and indication information 1595, refers to information indicating a state of the target object, such as, for example, a turn signal light activated by the target object, a hazard light activated by the target object, and a brake light activated by the target object for a period of time.

As illustrated in FIG. 15, the virtual lane generating device detects the indication information 1591 and 1595, for example, turn signal lights, from an object region 1515 of a first frame image of an external image 1500, and consecutively detects the indication information 1591 and 1595 from object regions 1511, 1512, 1513, and 1514 of a second frame image, a third frame image, a fourth frame image, and a fifth frame image, respectively, of the external image 1500. The virtual lane generating device excludes a driving group 1510 of a same target object associated with the detected indication information 1591 and 1595 in the process of generating the virtual lane. Thus, the virtual lane generating device generates a safer virtual lane by excluding a lane where an exceptional situation is detected. Some examples of the exceptional situation are a situation in which a preceding vehicle changes a driving route and a situation in which a preceding vehicle stops in an emergency. In an example, the safer virtual lane that is generated is provided to a user or an autonomous driving vehicle.

Figure 16:
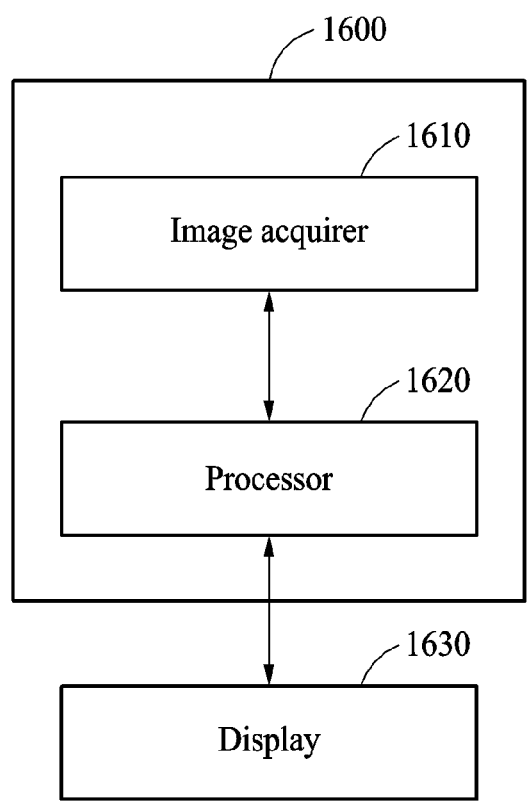
FIGS. 16 and 17 are diagrams illustrating examples of a virtual lane generating device.
Figure 17:
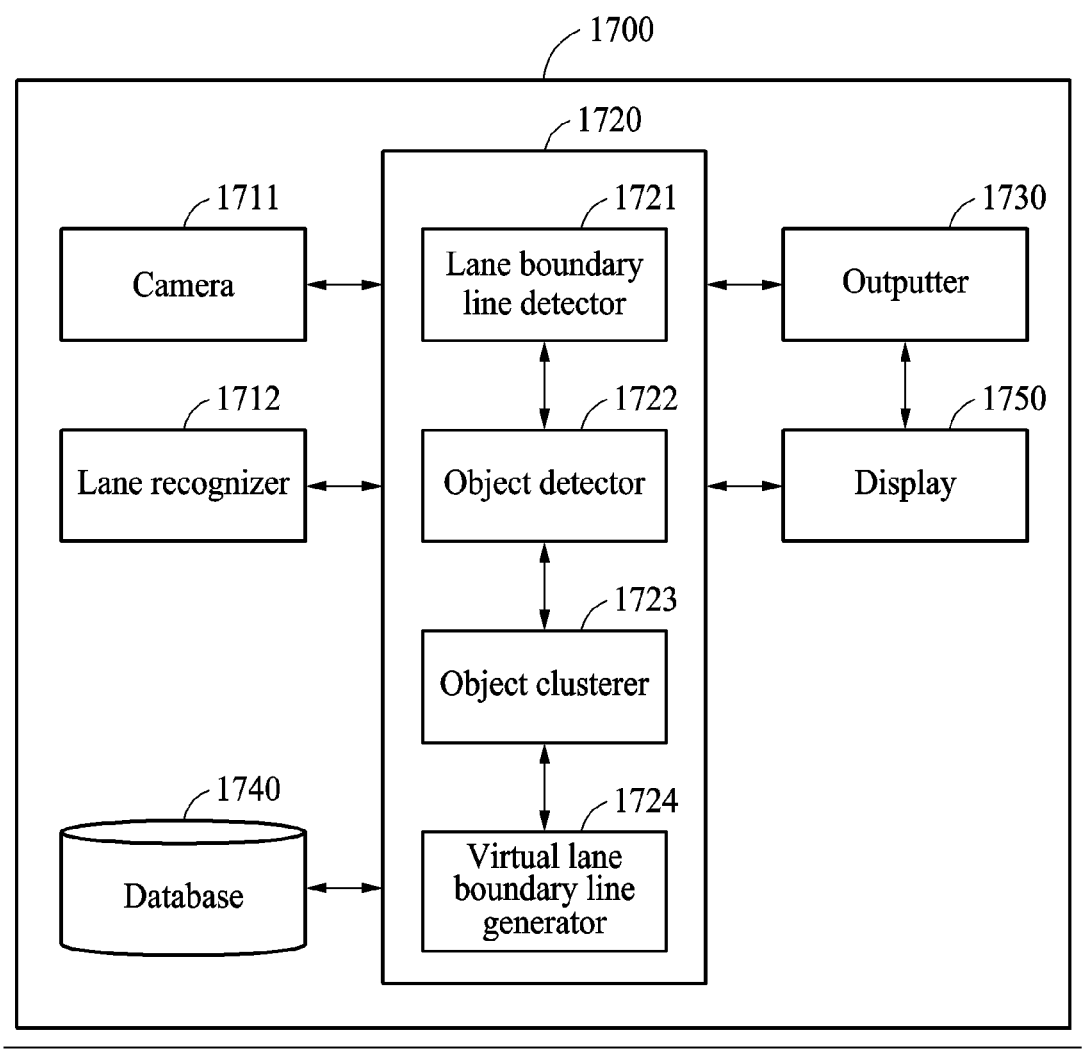

FIGS. 16 and 17 are diagrams illustrating examples of a virtual lane generating device.

Referring to FIG. 16, a virtual lane generating device 1600 includes an image acquirer 1610, a processor 1620, and a display 1630.

The image acquirer 1610 obtains an external image from a forward view of a vehicle.

The processor 1620 determines validity of lane detection information extracted from the external image, and generates a virtual lane based on an object included in the external image when it is determined that the lane detection information is not valid. In an example, the virtual lane is displayed on the display 1630. However, operations of the virtual lane generating device 1600 are not limited to the example described in the foregoing, and the operations may be combined with the operations described with reference to FIGS. 1 through 15.

Referring to FIG. 17, a virtual lane generating device 1700 includes a camera 1711, a lane recognizer 1712, a processor 1720, an outputter 1730, a database 1740, and a display 1750. The processor 1720 may perform similar operations to the processor 1620 of FIG. 16, and includes a lane boundary line detector 1721, an object detector 1722, an object cluster 1723, and a virtual lane boundary line generator 1724.

The camera 1711 captures an external image from a forward view of a vehicle, for example, an autonomous driving vehicle. In an example, the camera 1711 captures a color image as the external image. However, the external image is not limited to the color image, and a plurality of cameras that capture different type of images may be used.

The lane recognizer 1712 recognizes a situation of a road on which the vehicle is currently located. In an example, the lane recognizer 1712 identifies a location of the vehicle based on a GPS signal, and a distance to a nearby object using depth information based on a LiDAR sensor.

The lane boundary line detector 1721 detects, from the external image obtained through the camera 1711, a lane boundary line from the forward view of the vehicle.

The object detector 1722 identifies an object present in front of the vehicle from the external image. In an example, the object detector 1722 identifies a type of an object based on a feature of the object.

The object clusterer 1723 generates a driving group by clustering objects. In an example, the object clusterer 1723 generates a current driving group, a left-side driving group, and a right-side driving group based on a lane along which the vehicle currently travels.

The virtual lane boundary line generator 1724 generates a virtual lane boundary line based on the generated driving group. In an example, the virtual lane boundary line generator 1724 determines the virtual lane boundary line to be a line crossing a center of a region between generated driving groups.

The outputter 1730 outputs the generated virtual lane boundary line. In an example, the outputter 1730 outputs the virtual lane boundary line to a display 1750, through an audio signal, or to the vehicle. The virtual lane boundary line output by the outputter 1730 to the display may be provided to a driver as reference driving information. In an example, the outputter 1730 overlays the virtual lane boundary line on a realtime image. In addition, the outputter 1730 overlays the virtual lane boundary line on a road on a map of a navigation system and provides the overlaid virtual lane boundary line. Further, the outputter 1730 visually provides the driver with the virtual lane boundary line through a laser or projection with respect to the road from the forward view of the vehicle.

The database 1740 stores data needed to generate a virtual lane. The database 1740 includes, for example, a trained model used to estimate the virtual lane, weather information, traffic information, and map information.

When a driver is not able to recognize a lane boundary line or drive a vehicle along a lane in a normal way of driving, the virtual lane generating device 1700 may generate a virtual lane and provide the driver with the generated virtual lane to guide the driver through the virtual lane for driving.

The lane recognizer 1712, lane boundary line detector 1721, object detector 1722, object cluster 1723, virtual lane boundary line generator 1724, and other apparatuses, units, modules, devices, and other components illustrated in FIGS. 16 and 17 that perform the operations described herein with respect to FIGS. 1 through 15 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-2 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A virtual lane generating method, comprising:
   determining validity of lane detection information extracted from an image in front a vehicle; and
   generating a virtual lane based on an object included in the image, in response to a determination that the lane detection information is not valid,
   wherein the determining of the validity of the lane detection information comprises:
      extracting the lane detection information from the image; and
      determining whether a validity score of the lane detection information exceeds a threshold score.

2. The virtual lane generating method of claim 1, wherein the generating of the virtual lane comprises:
   generating at least one driving group by clustering objects present in the image; and
   generating the virtual lane based on the at least one driving group.

3. The virtual lane generating method of claim 2, wherein the generating of the virtual lane based on the at least one driving group comprises:
   estimating lane regions based on a region occupied by each of the at least one driving group, in response to the at least one driving group comprising a plurality of driving groups;
   generating a virtual lane boundary line between each of the estimated lane regions; and
   generating the virtual lane based on the virtual lane boundary line.

4. The virtual lane generating method of claim 3, further comprising:
   excluding adjacent lane boundary lines from among lane boundary lines generated by the generating the virtual lane boundary line between each of the estimated lane regions, in response to a distance between adjacent lane boundary lines being less than a threshold distance.

5. The virtual lane generating method of claim 1, wherein the generating of the virtual lane comprises:
   detecting the object from the image; and
   generating the virtual lane based on the detected object.

6. The virtual lane generating method of claim 5, wherein the detecting of the object comprises:
   detecting an object region comprising the object and a feature region comprising a feature portion of the object.

7. The virtual lane generating method of claim 1, wherein:
   the image comprises consecutive frame images; and
   the generating of the virtual lane comprises generating a driving group by tracking an object included in the consecutive frame images during a time period, and identifying the virtual lane based on the driving group.

8. The virtual lane generating method of claim 7, wherein the identifying of the driving group comprises generating the driving group by tracking a movement of the object, in response to a speed of the object differing from a speed of the vehicle.

9. The virtual lane generating method of claim 1, wherein the determining of whether the validity score exceeds the threshold score comprises:
   calculating the validity score based on any one or any combination of luminance level information associated with a luminance level around the vehicle, weather information, time information, and image quality information of the image.

10. The virtual lane generating method of claim 1, further comprising:
    displaying the virtual lane.

11. The virtual lane generating method of claim 1, wherein the determining of the validity of the lane detection information comprises:
    determining the validity of the lane detection information based on a feature of the object included in the image.

12. The virtual lane generating method of claim 1, wherein the determining of the validity of the lane detection information comprises:
    detecting a warning object from the image; and
    excluding, from the lane detection information, a lane boundary line corresponding to the warning object.

13. The virtual lane generating method of claim 1, wherein the generating of the virtual lane comprises:
    detecting a target object from the image; and
    excluding the target object in the generating of the virtual lane, in response to indication information being detected from the target object.

14. The virtual lane generating method of claim 1, further comprising: generating a driving route based on the generated virtual lane.

15. The virtual lane generating method of claim 1, wherein the determining of the validity of the lane detection information comprises:
    verifying whether a movement route of a target object matches a lane that is based on the lane detection information; and
    excluding a lane boundary line corresponding to the target object from the lane detection information, in response to the movement route not matching the lane that is based on the lane detection information.

16. The virtual lane generating method of claim 1, wherein the determining of the validity of the lane detection information comprises:

excluding a lane boundary line corresponding to a target object from the lane detection information, in response to a movement speed of the target object decreasing to less than a threshold speed.

17. The virtual lane generating method of claim 1, wherein the generating of the virtual lane comprises:
    detecting depth information indicating a distance to the object detected from the image;
    and generating the virtual lane based on the image and the depth information.

18. The virtual lane generating method of claim 1, wherein the generating of the virtual lane comprises:
    generating the virtual lane based on location information of the vehicle and road information corresponding to the location information.

19. The virtual lane generating method of claim 1, wherein the determining of the validity of the lane detection information comprises excluding a lane boundary line from the lane detection information, in response to a probability of the lane boundary line being less than a threshold probability.

20. The virtual lane generating method of claim 1, wherein the determining of the validity of the lane detection information comprises:
    calculating at least two validity scores based on any one or any combination of luminance level information associated with a luminance level around the vehicle, weather information, time information, a level of pollution, cleanliness of an exterior of the vehicle, and image quality information of the image; and
    verifying whether the at least two validity score of the lane detection information exceeds respective threshold scores.

21. The virtual lane generating method of claim 1, wherein the determining of the validity of the lane detection information comprises determining that the lane detection information is not valid, in response to the validity score of the lane detection information oscillating greater than a threshold oscillation.

22. The virtual lane generating method of claim 1, wherein the object comprises a target object that is tracked to generate the virtual lane, a warning object associated with information that warns the vehicle of danger, or a fixed object that is stationary.

23. The virtual lane generating method of claim 1, further comprising:
    obtaining weather information at a location of the vehicle, wherein the determining of the validity of the lane detection information is based on the weather information.

24. A non-transitory computer-readable medium storing instructions that, when executed by a processor, cause the processor to perform the method of claim 1.

25. A virtual lane generating device, comprising:
    a camera configured to obtain an image in front of a vehicle; and
    a processor configured to determine validity of lane detection information extracted from the image, and to generate a virtual lane based on an object in the image, in response to a determination that the lane detection information is not valid,
    wherein the determining of the validity of the lane detection information comprises extracting the lane detection information from the image, and determining whether a validity score of the lane detection information exceeds a threshold score.

26. A virtual lane generating method, comprising:
    determining validity of lane detection information extracted from an image in front a vehicle, the determining of the validity of the lane detection information comprising extracting the lane detection information from the image, and determining whether a validity score of the lane detection information exceeds a threshold score;
    generating at least one driving group by clustering objects present in the image, in response the lane detection information being invalid;
    estimating lane regions based on a region occupied by each of the at least one driving group, in response to the at least one driving group comprising a plurality of driving groups;
    generating a virtual lane boundary line between each of the estimated lane regions; and
    generating a virtual lane based on the virtual lane boundary lines.

27. The virtual lane generating method of claim 26, wherein the objects comprise any one or any combination of a target object that is tracked to generate the virtual lane, a preceding vehicle, a nearby vehicle, a vehicle feature, a warning object associated with information that warns the vehicle of danger, and a fixed object that is stationary.

28. The virtual lane generating method of claim 26, wherein the generating of the at least one driving group comprises:
    obtaining road information at a location of the vehicle; and
    determining a maximum number and a minimum number of driving groups to be generated based on the road information.

29. The virtual lane generating method of claim 28, wherein the road information comprises any one or any combination of a width of a road at the location, a number of lanes on the road at the location, and a condition of the road at the location.

30. A virtual lane generating apparatus comprising:
    a sensor configured to capture an image in front of a vehicle;
    a touch-sensitive display;
    a memory configured to store instructions;
    a processor configured to receive the image, and execute the instructions to determine validity of lane detection information extracted from the image, to generate a virtual lane based on an object in the image, in response to the lane detection information being invalid, and to output the virtual lane to the touch-sensitive display or an autonomous driving apparatus,
    wherein the processor is further configured to determine the validity of the lane detection information by extracting the lane detection information from the image, and determining whether a validity score of the lane detection information exceeds a threshold score.

31. The virtual lane generating apparatus of claim 30, wherein the processor is further configured to generate the virtual lane based on the object, location information collected from a Global Positioning System (GPS), and Light Detection and Ranging data (LiDAR).

* * * * *